US011292363B2

(12) United States Patent
Shimauchi et al.

(10) Patent No.: US 11,292,363 B2
(45) Date of Patent: Apr. 5, 2022

(54) CHARGING SYSTEM

(71) Applicant: TOYOTA JIDOSHA KABUSHIKI KAISHA, Toyota (JP)

(72) Inventors: Takayuki Shimauchi, Toyota (JP); Makoto Mimoto, Chita-gun (JP); Kunihiko Jinno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 16/265,320

(22) Filed: Feb. 1, 2019

(65) Prior Publication Data
US 2019/0241093 A1 Aug. 8, 2019

(30) Foreign Application Priority Data
Feb. 7, 2018 (JP) .............................. JP2018-020207

(51) Int. Cl.
*H02J 7/00* (2006.01)
*B60L 58/26* (2019.01)
(Continued)

(52) U.S. Cl.
CPC ............... *B60L 58/26* (2019.02); *B60L 53/12* (2019.02); *B60L 53/16* (2019.02); *B60L 53/31* (2019.02); *B60L 58/27* (2019.02); *H01M 10/613* (2015.04); *H01M 10/625* (2015.04); *B60K 6/28* (2013.01); *B60L 50/60* (2019.02); *B60Y 2200/91* (2013.01); *B60Y 2200/92* (2013.01); *B60Y 2300/91* (2013.01); *B60Y 2306/05* (2013.01); *B60Y 2400/112* (2013.01); *H01M 2220/20* (2013.01)

(58) Field of Classification Search
USPC ....................................................... 320/109
See application file for complete search history.

(56) References Cited

U.S. PATENT DOCUMENTS 4,007,315 A * 2/1977 Brinkmann .............. B60K 1/04
429/62
2010/0217485 A1 8/2010 Ichishi
(Continued)

FOREIGN PATENT DOCUMENTS

JP 2008-054423 A 3/2008
JP 2009-083670 A 4/2009
(Continued)

*Primary Examiner* — Samuel Berhanu
(74) *Attorney, Agent, or Firm* — Oliff PLC

(57) ABSTRACT

A charging system is installed outside an electric vehicle to charge an in-vehicle battery mounted in the electric vehicle. The charging system includes a charger that supplies electricity to the in-vehicle battery, an external cooling device that cools the in-vehicle battery, and an off-vehicle controller that controls driving of the charger and the external cooling device. The external cooling device has an external channel which is provided inside the charging system and through which an external refrigerant flows, cooling mechanisms that include at least a compressor and cool the external refrigerant, and a heat exchanger that exchanges heat between the cooled external refrigerant and an internal refrigerant that flows inside the electric vehicle to cool the in-vehicle battery or outside air that is sent to the electric vehicle to cool the in-vehicle battery.

11 Claims, 11 Drawing Sheets

(51) Int. Cl.
   *H01M 10/613*   (2014.01)
   *H01M 10/625*   (2014.01)
   *B60L 53/12*    (2019.01)
   *B60L 58/27*    (2019.01)
   *B60L 53/16*    (2019.01)
   *B60L 53/31*    (2019.01)
   *B60L 50/60*        (2019.01)
   *B60K 6/28*         (2007.10)

(56) References Cited

U.S. PATENT DOCUMENTS

| | | | |
|---|---|---|---|
| 2013/0047616 A1* | 2/2013 | Holmes | F24D 11/009 |
| | | | 60/670 |
| 2013/0241490 A1* | 9/2013 | Kim | B60L 58/27 |
| | | | 320/112 |
| 2014/0292260 A1* | 10/2014 | Dyer | H02J 7/0029 |
| | | | 320/107 |
| 2014/0316630 A1* | 10/2014 | Kohlberger | B60L 58/27 |
| | | | 701/22 |
| 2014/0338376 A1* | 11/2014 | Carpenter | B60L 58/27 |
| | | | 62/115 |
| 2015/0054460 A1* | 2/2015 | Epstein | B60L 58/24 |
| | | | 320/109 |
| 2015/0197134 A1* | 7/2015 | Carter | F01P 11/04 |
| | | | 165/41 |
| 2016/0280207 A1* | 9/2016 | Rockwell | B60W 20/00 |
| 2017/0088005 A1* | 3/2017 | Christen | B60L 11/1874 |
| 2017/0088007 A1 | 3/2017 | Melendez et al. | |

FOREIGN PATENT DOCUMENTS

| | | |
|---|---|---|
| JP | 2017-004849 A | 1/2017 |
| WO | 2009/069481 A1 | 6/2009 |

\* cited by examiner

CHARGING SYSTEM

INCORPORATION BY REFERENCE

The disclosure of Japanese Patent Application No. 2018-020207 filed on Feb. 7, 2018 including the specification, drawings and abstract is incorporated herein by reference in its entirety.

BACKGROUND

1. Technical Field

The present specification discloses a charging system that is installed outside an electric vehicle to charge an in-vehicle battery mounted in the electric vehicle.

2. Description of Related Art

Recently, electric vehicles equipped with a rotating electric machine as one of traveling power sources have become widely known. Such an electric vehicle is equipped with an in-vehicle battery that gives and receives electricity to and from the rotating electric machine. When the SOC of the in-vehicle battery has become low, the in-vehicle battery is charged with electricity from outside.

In this regard, quick charging that can reduce the charging time of an in-vehicle battery has been proposed. In quick charging, high current flows through an in-vehicle battery and thus charging is completed in a relatively short time, while a larger amount of heat is generated by the in-vehicle battery. If the in-vehicle battery reaches an excessively high temperature due to the heat thus generated, the in-vehicle battery may deteriorate. To prevent this, a technique of cooling an in-vehicle battery during quick charging by a cooling device mounted in an electric vehicle has been proposed.

For example, Japanese Patent Application Publication No. 2009-83670 (JP 2009-83670 A) discloses a vehicle provided with a blower fan that blows air to a power source unit (in-vehicle battery) and an air-conditioning unit that has a compressor and generates a current of cooling air. The technique of this related art involves driving the blower fan when the temperature of the power source unit is equal to or higher than a first temperature but lower than a second temperature, and activating the compressor in addition to the blower fan when the temperature of the power source unit is equal to or higher than the second temperature. According to the technique of JP 2009-83670 A, the in-vehicle battery is not only air-cooled but also forcedly cooled with a current of cooling air generated by the compressor, which can suppress the temperature rise of the in-vehicle battery to some extent.

SUMMARY

A compressor used to cool a battery as described above is typically an air-conditioning compressor that is used to cool a vehicle cabin. The capacity of such an air-conditioning compressor is more or less predetermined, and is not always sufficient to cool an in-vehicle battery during quick charging. Since an electric automobile that is not equipped with an engine cannot use exhaust heat of an engine for heating, some electric automobiles are equipped with a heat-pump air conditioner. In some cases, when heating by this heat-pump air conditioner is in progress, the air-conditioning compressor cannot be used to cool the in-vehicle battery.

The present disclosure discloses a charging system that can more appropriately cool an in-vehicle battery during external charging.

An aspect of the present disclosure is a charging system that is installed outside an electric vehicle and configured to charge an in-vehicle battery mounted in the electric vehicle. The charging system includes a charger, an external cooling device, and an off-vehicle controller. The charger is configured to supply electricity to the in-vehicle battery. The external cooling device is configured to cool the in-vehicle battery. The external cooling device includes an external channel through which the external refrigerant flows, a cooling mechanism configured to cool an external refrigerant, and a heat exchanger. The external channel is provided inside the charging system. The cooling mechanism includes at least a compressor. The heat exchanger is configured to exchange heat between the cooled external refrigerant and an internal refrigerant that flows inside the electric vehicle so as to cool the in-vehicle battery or between the cooled external refrigerant and outside air that is sent to the electric vehicle so as to cool the in-vehicle battery. The off-vehicle controller is configured to control driving of the charger and the external cooling device.

This configuration allows the in-vehicle battery to be cooled by the external cooling device even when the capacity of the cooling device mounted in the electric vehicle is low or even while heat-pump heating is executed. Thus, the in-vehicle battery can be more appropriately cooled during external charging.

The electric vehicle may include an internal cooling device configured to cool the in-vehicle battery through heat exchange with outside air, and the off-vehicle controller may be configured to give a command to the electric vehicle to cool the in-vehicle battery through heat exchange with the outside air by the internal cooling device when the in-vehicle battery needs to be cooled and the temperature of the in-vehicle battery is higher than the temperature of the outside air.

Using outside air to cool the in-vehicle battery can reduce the electricity required to cool the in-vehicle battery.

In the above charging system, the off-vehicle controller may be configured to determine whether external cooling by the external cooling device is required, based on a result of a comparison between an amount of cooling by the internal cooling device and an amount of heat generation by the in-vehicle battery.

Using the external cooling device when the internal cooling device alone cannot provide a sufficient amount of cooling can reduce the electricity consumption and cost associated with the use of the external cooling device.

In the above charging system, the off-vehicle controller may be configured to allow heat from the in-vehicle battery of the electric vehicle to be used to warm up a battery of another electric vehicle when, while the electric vehicle is charged, the in-vehicle battery needs to be cooled and the temperature of the in-vehicle battery is higher than the temperature of the outside air and the electric vehicle does not need heat.

This configuration allows the battery of another electric vehicle to be efficiently warmed up, which can effectively prevent a delay in the rise of a charging current, limitation of electricity output at the start of running, and other inconveniences in that electric vehicle.

In the above charging system, when charging commands for two or more electric vehicles are input within a certain time, the off-vehicle controller may be configured to determine a waiting rank that is a rank in an order of starting charging, based on a charging time limit and an amount of heat generation per unit time of each electric vehicle.

This configuration allows a plurality of electric vehicles to be efficiently charged.

The above charging system may further include a plug that is attachable to and detachable from an inlet provided in the electric vehicle. The external cooling device may further include a bypass channel that is fluid-coupled to an in-vehicle channel which is provided inside the electric vehicle and through which the internal refrigerant flows, and that is provided so as to guide the internal refrigerant to the heat exchanger and return the internal refrigerant having passed through the heat exchanger to the in-vehicle channel. The heat exchanger may be configured to exchange heat between the cooled external refrigerant and the internal refrigerant, and the plug may have an electricity terminal through which the charger and the in-vehicle battery are electrically connected to each other, and a fluid coupler through which the bypass channel and the in-vehicle channel are fluidically coupled to each other.

This configuration allows the internal refrigerant to be efficiently cooled by the external cooling device.

In the above charging system, the charger may be configured to transmit electricity to the in-vehicle battery in a contactless manner. The external cooling device may further include an external fan that blows air to the electric vehicle. The heat exchanger may be configured to exchange heat between the external refrigerant and outside air that is blown to the electric vehicle by the external fan.

This configuration allows the in-vehicle battery to be appropriately cooled also in the case of contactless charging.

The above-described charging system can cool an in-vehicle battery by the external cooling device even when the capacity of a cooling device mounted in the electric vehicle is low or even while heat-pump heating is executed. Thus, this charging system can more appropriately cool the in-vehicle battery during external charging.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
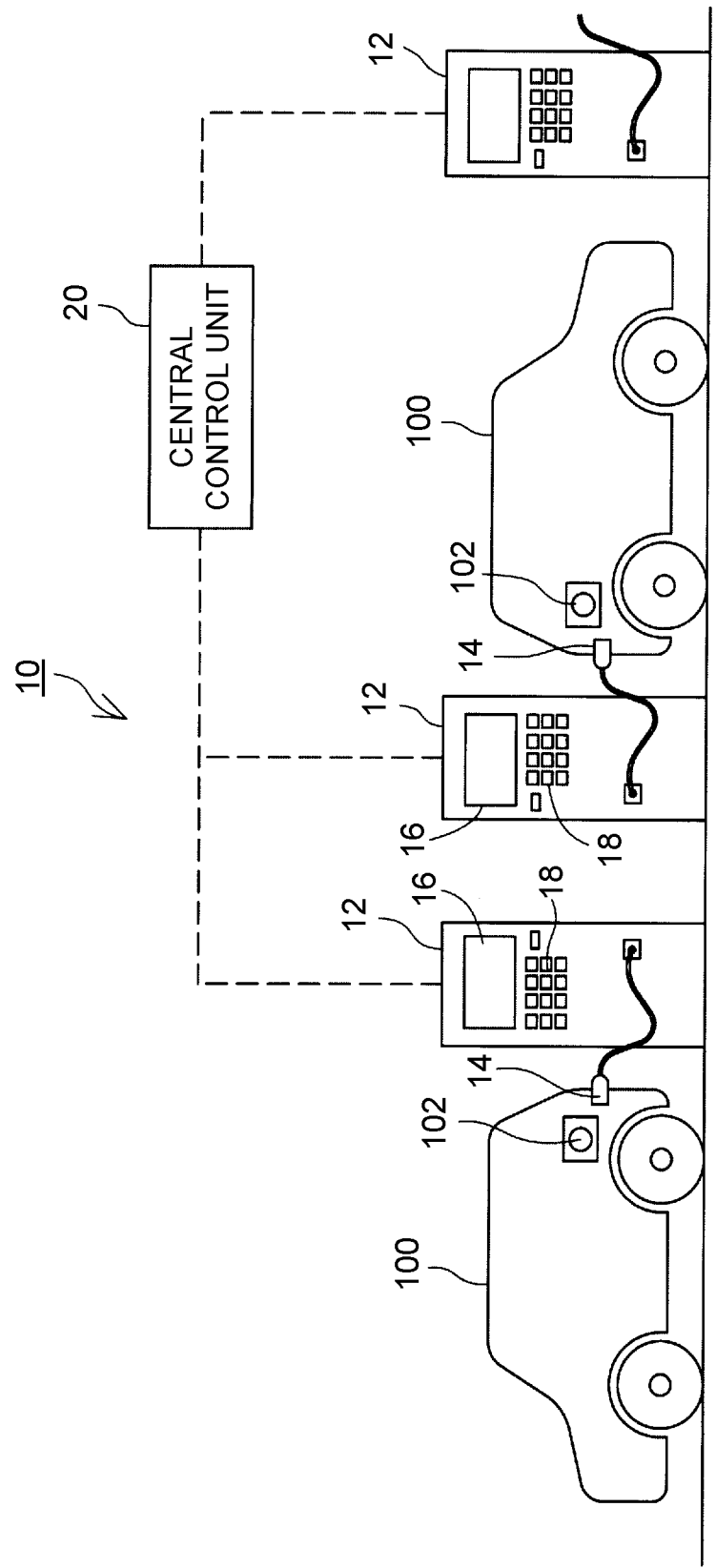
FIG. 1 is an image of a charging station.

The present disclosure will be described below with reference to the drawings. FIG. 1 is an image of a charging station 10. The charging station 10 is a facility that charges an in-vehicle battery 106 mounted in an electric vehicle 100, and is an example of a charging system having a plurality of charging stands 12. The electric vehicle 100 to be charged may be any vehicle that can be externally charged, for example, a hybrid vehicle that has a rotating electric machine and an engine as motive power sources, or an electric automobile that runs only on motive power from a rotating electric machine.

The charging station 10 has the charging stands 12 and a central control unit 20 that manages the charging stands 12. As shown in FIG. 1, each charging stand 12 has an output unit 16 that provides a user with information and an input unit 18 that receives an operation command from the user. For example, the output unit 16 is formed by a monitor, a speaker, a light, etc. that are independent of or combined with one another. For example, the input unit 18 is formed by buttons, a keyboard, a touch panel, a microphone, etc. that are independent of or combined with one another. The charging stand 12 is further provided with a charging plug 14 that is detachably attached to an inlet 102 of the electric vehicle 100. The charging plug 14 is provided not only with an electricity terminal through which electricity is transmitted to the in-vehicle battery 106, but also with a signal terminal through which electric signals are given to and received from the electric vehicle 100, and fluid couplers, to be described later, that are fluid-coupled to a channel inside the electric vehicle 100.

The number of the charging stands 12 provided in one charging station 10 is not particularly limited, as long as the number is one or larger. The number of the vehicles that can be charged at the same time by one charging stand 12 is not particularly limited, either, as long as the number is one or larger. Thus, one charging stand 12 may be provided with two or more each of charging plugs 14, input units 18, and output units 16. In the following, the charging station 10 having a plurality of charging stands 12 to each of which one electric vehicle 100 can be connected will be described.

Figure 2:
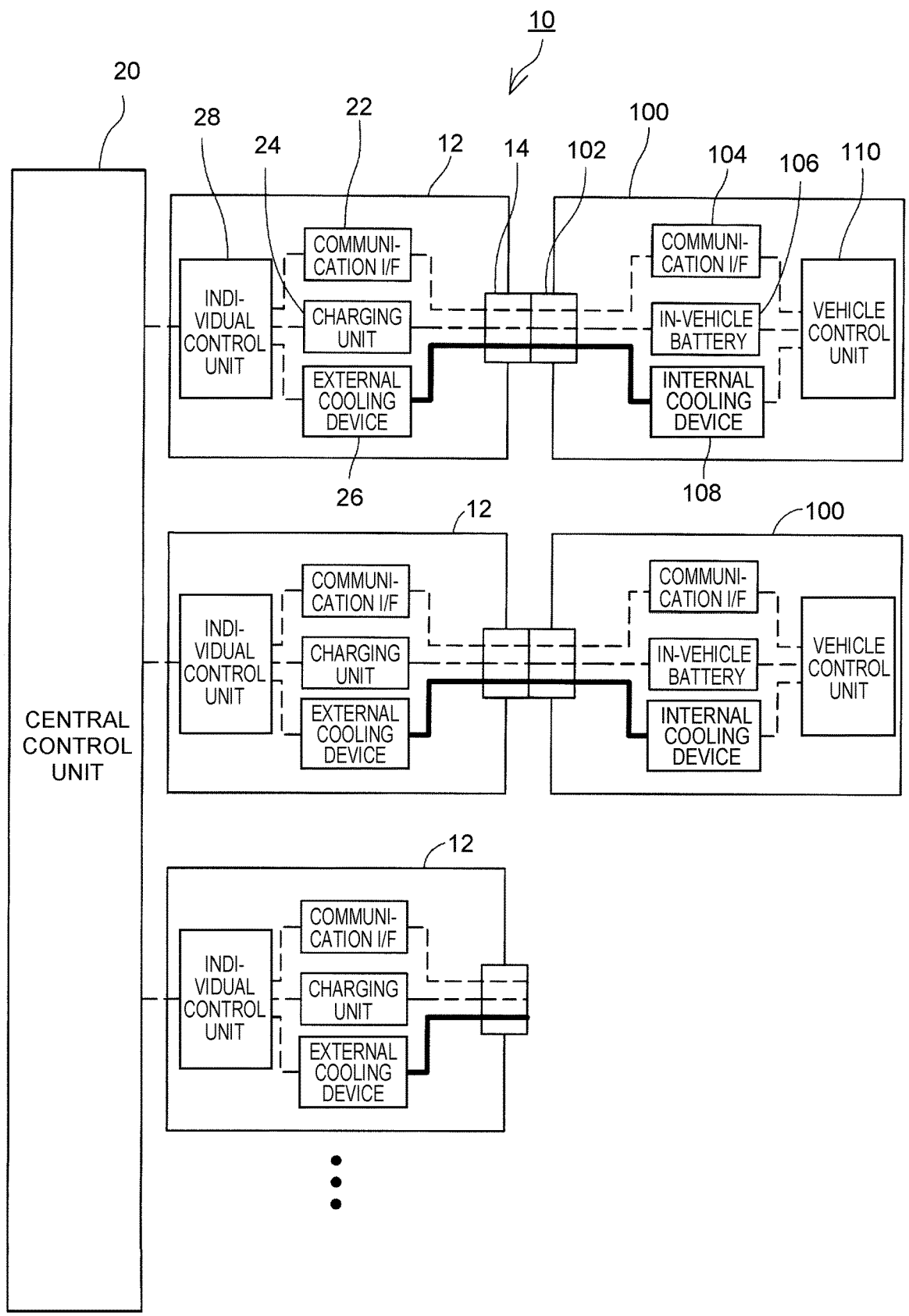
FIG. 2 is a block diagram showing the internal configuration of the charging station.

FIG. 2 is a block diagram showing the internal configuration of the charging station 10. In FIG. 2, only especially important elements among elements of the charging stand 12 and the electric vehicle 100 are shown, while many other elements are not shown. In FIG. 2, the dashed lines, long dashed-short dashed lines, and thick lines represent electric signal lines, power lines, and fluid channels, respectively.

As shown in FIG. 2, each charging stand 12 has a charging unit 24, an external cooling device 26, a communication interface (hereinafter referred to as a "communication I/F") 22, the charging plug 14, and an individual control unit 28. The charging unit 24 is a unit that supplies electricity to the electric vehicle 100 based on a command from a vehicle control unit 110. For example, the charging unit 24 converts alternating-current power from a commercial power source into direct-current power and transmits this direct-current power, and includes an AC-DC converter and the like. The value of electricity supplied from the charging unit 24 can be changed as necessary. For example, a large amount of electricity is supplied when charging is required to be completed in a short time, and a small amount of electricity is charged when a temperature rise of the in-vehicle battery 106 should be avoided.

The communication I/F 22 converts the format of various signals to be given to and received from the electric vehicle 100 into a format suitable for communication. The individual control unit 28 of the charging stand 12 receives a signal showing a state of the electric vehicle 100 from the electric vehicle 100 through the communication I/F 22. Examples of the state of the electric vehicle 100 include the capacity, the SOC, and the temperature of the in-vehicle battery 106, and the operation status of an air-conditioning system. The individual control unit 28 of the charging stand 12 sends a command to start internal cooling, to be described later, and other commands to the electric vehicle 100 through the communication I/F 22.

The external cooling device 26 is a cooling device provided in the charging stand 12, and is a device that cools the in-vehicle battery 106 from outside the electric vehicle 100. While the specific configuration of the external cooling device 26 will be described in detail later, the external cooling device 26 has a channel that is fluid-coupled to an internal channel provided in the electric vehicle 100 through the charging plug 14 (to be exact, the fluid couplers provided in the charging plug 14).

The individual control unit 28 controls driving of the communication I/F 22, the charging unit 24, the external cooling device 26, etc., and includes, for example, a CPU that performs various calculations and a memory that stores various data and programs. The individual control unit 28 drives the charging unit 24, etc. according to a command from the central control unit 20 to charge or cool the corresponding in-vehicle battery 106. As necessary, the individual control unit 28 transmits to the central control unit 20 various data sent from the electric vehicle 100. There is a plurality of individual control units 28, and these individual control units 28 and one central control unit 20 function as an off-vehicle control unit that controls driving of the charging unit 24 and the external cooling device 26. While one individual control unit 28 is provided in each charging stand 12 in this example, the individual control unit 28 may be omitted. In this case, one central control unit 20 controls pluralities of charging units 24, external cooling devices 26, and others.

The electric vehicle 100 is provided with a communication I/F 104, the in-vehicle battery 106, and an internal cooling device 108. The in-vehicle battery 106 is a secondary battery that gives and receives electricity to and from a rotating electric machine provided in the electric vehicle 100. The capacity of the in-vehicle battery 106 varies widely among vehicle models. In particular, there is a several-fold to several-ten-fold difference in the capacity of the in-vehicle battery 106 between a hybrid automobile equipped with an engine and an electric automobile having no engine. Like the communication I/F 22 of the charging stand 12, the communication I/F 104 converts the format of various signals to be given to or received from the charging stand 12 into a format suitable for communication.

The internal cooling device 108 is a cooling device that is provided in the electric vehicle 100 to cool the in-vehicle battery 106. The internal cooling device 108 includes a channel through which an internal refrigerant for cooling the in-vehicle battery 106 flows. This channel can be fluid-connected to a channel of the charging stand 12 through the inlet 102. An air-conditioning system (not shown in FIG. 2) that cools and heats a vehicle cabin also functions as a part of the internal cooling device 108. As necessary, the internal refrigerant can be cooled by using a cooling function of the air-conditioning system, or the vehicle cabin can be heated by using the heat of the internal refrigerant.

The vehicle control unit 110 controls driving of the electric vehicle 100, and has a CPU that performs various calculations and a memory that stores various data and programs. The vehicle control unit 110 may be formed by a single control unit or by a combination of a plurality of control units. The memory of the vehicle control unit 110 stores the capacity and the internal resistance value of the in-vehicle battery 106, the specifications (cooling capacity, etc.) of the internal cooling device 108, and the like. In addition to these data, the memory of the vehicle control unit 110 stores the temperature, the voltage value, and the current value of the in-vehicle battery 106 and the outside air temperature that are detected by various sensors, the SOC of the in-vehicle battery 106 obtained by calculation, and the operation status of the air-conditioning system. As necessary, these various pieces of stored information are sent to the charging stand 12 through the communication I/F 104. The vehicle control unit 110 also controls driving of the internal cooling device 108 according to a command from the charging stand 12.

Figure 3:
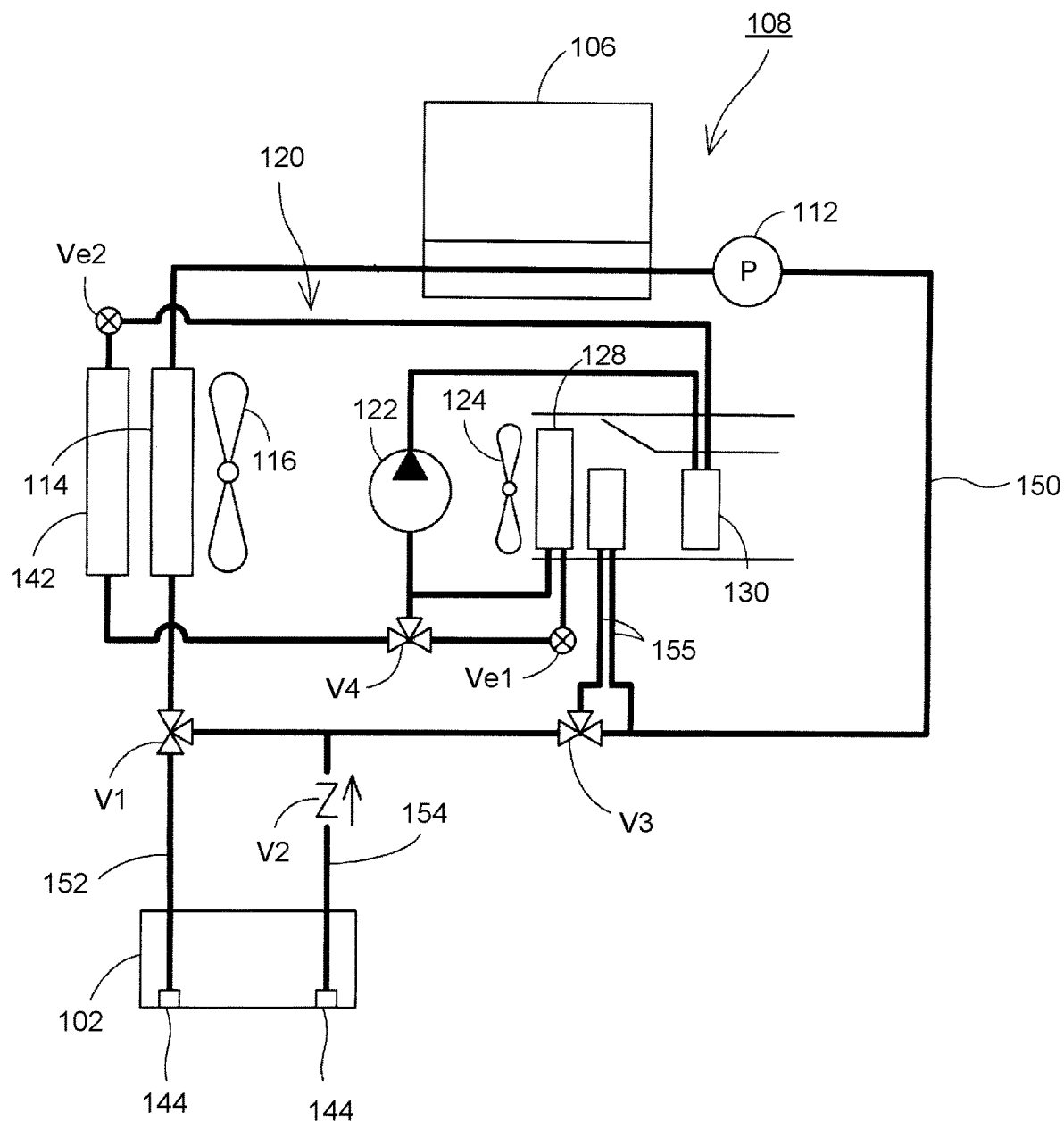
FIG. 3 is a view showing the configuration of an internal cooling device.
Figure 4:
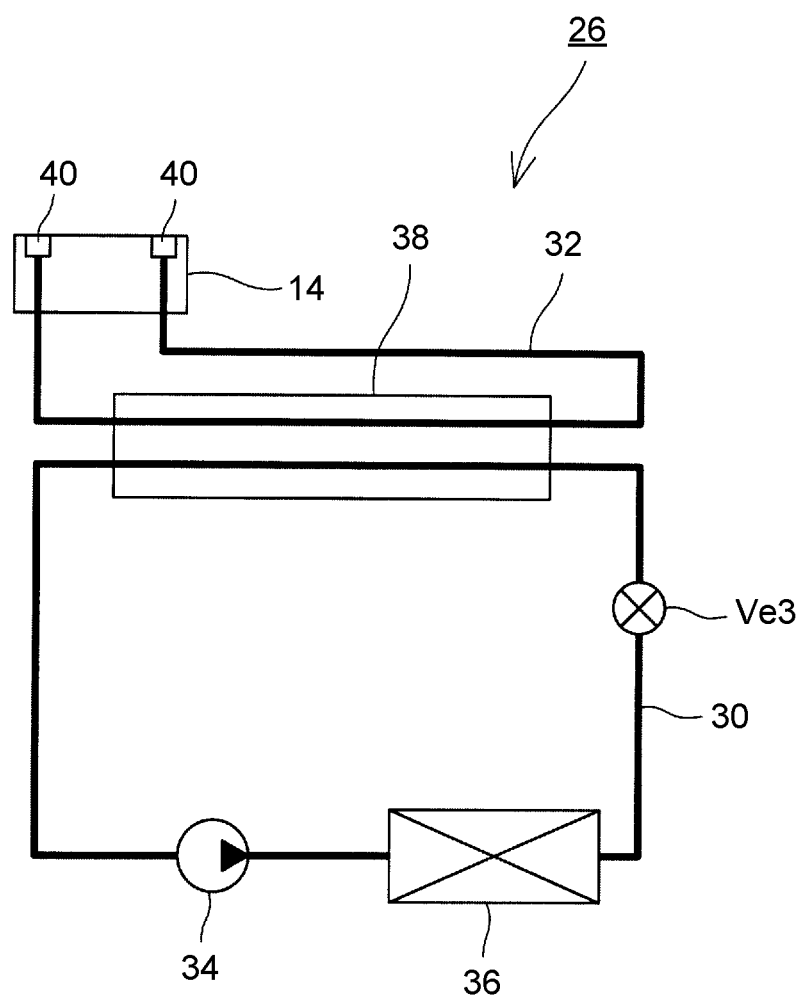
FIG. 4 is a view showing the configuration of an external cooling device.

Next, the configurations of the internal cooling device 108 and the external cooling device 26 will be described with reference to FIG. 3 and FIG. 4. FIG. 3 is a view showing the configuration of the internal cooling device 108, and FIG. 4 is a view showing the configuration of the external cooling device 26. First, the configuration of the internal cooling device 108 will be described. The internal cooling device 108 includes an internal channel through which the internal refrigerant flows. The internal channel includes a standard channel 150 that runs from a pump 112 through the in-vehicle battery 106 and a radiator core 114 back to the pump 112. The internal refrigerant flowing through the standard channel 150 is pumped out by the pump 112 and then exchanges heat with the in-vehicle battery 106. The internal refrigerant of which the temperature has risen as a result of heat exchange with the in-vehicle battery 106 is cooled by exchanging heat with outside air in the radiator core 114, before being used again to cool the in-vehicle battery 106. Thus, the internal cooling device 108 has an air-cooling function of cooling the internal refrigerant, and ultimately the in-vehicle battery 106, through heat exchange with outside air.

An outflow channel 152 and an inflow channel 154 are provided on the route of the standard channel 150 and branch off toward the inlet 102. The outflow channel 152 and the inflow channel 154 are channels that communicate with a bypass channel 32 provided in the external cooling device 26 (charging stand 12). Leading ends of the outflow channel 152 and the inflow channel 154 are connected to fluid couplers 144 provided in the inlet 102. A three-way valve V1 is provided at a point at which the outflow channel 152 branches off from the standard channel 150, and can switch the refrigerant channel. A check valve V2 is provided on the route of the inflow channel 154, and allows only a flow in a direction from the fluid coupler 144 toward the standard channel 150.

A detour channel 155 is connected on the route of the standard channel 150. The detour channel 155 is a channel that branches off from the standard channel 150 and then runs through the leeward side of an evaporator 128 of an air-conditioning system 120 back to the standard channel 150. The detour channel 155 can receive cold air having passed through the evaporator 128. A three-way valve V3 is provided at a point at which the detour channel 155 branches off from the standard channel 150, and can switch the internal refrigerant channel.

The air-conditioning system 120 cools and heats the inside of the vehicle cabin. There are two types of the air-conditioning system 120: one uses exhaust heat of the engine for heating, and the other is heat-pump heating that provides heating based on the heat pump principle. Most electric automobiles that are not equipped with an engine are provided with a heat-pump air-conditioning system. FIG. 3 shows a heat-pump air-conditioning system. This air-conditioning system 120 includes: an air-conditioning compressor 122 that compresses a gaseous air-conditioning refrigerant; expansion valves Ve1, Ve2 that expand the air-conditioning refrigerant as necessary; the evaporator 128 that evaporates the air-conditioning refrigerant in a state of gas-liquid mixture and absorbs the heat; a condenser 130 that condenses the high-temperature, high-pressure gaseous air-conditioning refrigerant and releases the heat; an air-conditioning fan 124 that blows air into the vehicle cabin from the upstream side of the evaporator 128 and the condenser 130; and an external heat exchanger 142 that exchanges heat between the high-temperature, high-pressure air-conditioning refrigerant and outside air.

To cool the vehicle cabin, a three-way valve V4 is switched to a route running from the external heat exchanger 142 to the expansion valve Ve1 so as to send the air-conditioning refrigerant to the evaporator 128. During this cooling, the external heat exchanger 142 functions as a heat radiator that releases the heat of the air-conditioning refrigerant into the outside air. As necessary, the vehicle control unit 110 executes control for cooling the internal refrigerant, and ultimately the in-vehicle battery 106, by using the cooling function of the air-conditioning system (i.e., by driving the air-conditioning compressor 122). Specifically, during cooling, the three-way valve V3 is switched so as to allow the internal refrigerant to flow through the detour channel 155, so that the internal refrigerant is subjected to air cooled by the evaporator 128 and is thus forcedly cooled.

To heat the vehicle cabin, the three-way valve V4 is switched to a route running from the external heat exchanger 142 to the air-conditioning compressor 122. In this case, the air-conditioning refrigerant flows to the air-conditioning compressor 122 and the condenser 130 without passing through the evaporator 128. During this heating, the external heat exchanger 142 functions as a heat sink that takes the heat of outside air into the air-conditioning refrigerant. While this heat-pump heating is executed, the air-conditioning compressor 122 is used to heat the vehicle cabin and therefore cannot be used to cool the in-vehicle battery 106, and forced cooling cannot be executed. Most vehicles equipped with an engine, such as hybrid automobiles, adopt exhaust heat-based heating that uses the exhaust heat of the engine (not shown in FIG. 3). In this case, the air-conditioning system is provided with a heater core that exchanges heat between the exhaust heat of the engine and air inside the vehicle cabin. In the case of this exhaust heat-based heating, the air-conditioning compressor 122 can be used to cool the in-vehicle battery 106, and therefore forced cooling can be executed, even during execution of heating. Hereinafter, cooling of the in-vehicle battery 106 by the internal cooling device 108 will be referred to as "internal cooling." As is clear from the above description, the internal cooling includes air cooling using heat exchange with outside air and forced cooling using the cooling function and involving driving the air-conditioning compressor 122, etc.

Next, the external cooling device 26 will be described with reference to FIG. 4. The external cooling device 26 is a device that cools the in-vehicle battery 106 mounted in the electric vehicle 100 connected through the charging plug 14. The external cooling device 26 includes: the external channel 30 through which an external refrigerant flows; the bypass channel 32 into and through which the internal refrigerant flows; a compressor 34 that compresses the external refrigerant; a condenser 36 that condenses the external refrigerant and releases the heat; an expansion valve Ve3 that expands the external refrigerant; and a chiller 38 (heat exchanger) that exchanges heat between the external refrigerant and the internal refrigerant. The external channel 30 is a loop channel provided inside the charging stand 12 (outside the electric vehicle 100). The compressor 34, the condenser 36, the expansion valve Ve, and the chiller 38 are provided on the route of the external channel 30. The compressor 34, the condenser 36, and the expansion valve Ve function as cooling mechanisms that cool the external refrigerant. The external refrigerant and the internal refrigerant exchange heat with each other in the chiller 38, and thereby the internal refrigerant is cooled. The external refrigerant of which the temperature has risen as a result of heat exchange with the internal refrigerant is cooled as the compressor 34, etc. are driven.

The bypass channel 32 is a channel that runs through the inside of the chiller 38, and both ends of the bypass channel 32 are coupled to the fluid couplers 40 provided in the charging plug 14. When the charging plug 14 is inserted into the inlet 102, the outflow channel 152, the bypass channel 32, and the inflow channel 154 are fluid-coupled to one another through the fluid couplers 40. Each of the fluid couplers 40, 144 provided in the charging plug 14 and the inlet 102 has a valve function of being opened as the plug 14 and the inlet 102 are connected to each other and being closed as the plug 14 and the inlet 102 are disconnected, and thus prevents the refrigerant from leaking out during disconnection.

When the three-way valve V1 is switched to a route running from the radiator core 114 to the fluid couplers 144 in a state where the charging plug 14 is attached to the inlet 102, the internal refrigerant flows through the bypass channel 32. With the internal refrigerant flowing through the bypass channel 32, the compressor 34, etc. are driven to forcedly cool the external refrigerant, and thus the internal refrigerant, and ultimately the in-vehicle battery 106, are cooled by the external cooling device 26. Hereinafter, cooling of the in-vehicle battery 106 by the external cooling device 26 will be referred to as "external cooling."

Here, in this example, the capacity (power or watt) of the external cooling device 26 is set to be significantly higher than the capacity of the internal cooling device 108. This is to allow for prompt completion of charging by appropriately cooling the in-vehicle battery 106 even when the in-vehicle battery 106 generates a larger amount of heat than the internal cooling device 108 can handle.

Specifically, most internal cooling devices 108 generally have a capacity of 4 kW to 5 kW. On the other hand, the amount of heat generation by the in-vehicle battery 106 can be much larger than 5 kW depending on the conditions of quick charging. For example, consider the case of an in-vehicle battery 106 that is mounted in an electric automobile having a range of 350 miles (about 564 km). The capacity of such an in-vehicle battery 106 is about 70 kWh, although it depends also on the electricity consumption rate (the running distance per kilowatt) of the electric automobile. This value is several times to several tens of times larger than the capacity of the in-vehicle battery 106 mounted in a common hybrid automobile. If this in-vehicle battery 106 is to be charged within 30 minutes, an amount of heat generation Qb by the in-vehicle battery 106 is around 8 kW, with some variation according to various conditions. This amount of heat generation Qb can be reduced by reducing charging electricity Pc supplied to the in-vehicle battery 106. However, reducing the charging electricity Pc results in a prolonged charging time tc, since the charging time tc is a value obtained by dividing a battery capacity C by the charging electricity Pc (tc=C/Pc). Thus, if one tries to quickly charge a high-capacity in-vehicle battery 106 mounted in an electric automobile or the like, the amount of heat generation Qb by the in-vehicle battery 106 significantly exceeds the cooling capacity of the internal cooling device 108 (air-conditioning system 120). As a result, the internal cooling device 108 alone cannot handle quick charging of the high-capacity in-vehicle battery 106. As described above, electric automobiles adopt heat-pump heating as the heating method. During a time when heat-pump heating is in progress, the cooling function of the air-conditioning system cannot be used and the in-vehicle battery 106 cannot be appropriately cooled.

In this example, therefore, the external cooling device 26 is provided in the off-vehicle charging system (charging station 10), and when necessary, the in-vehicle battery 106 is cooled by the external cooling device 26 as described above. Thus, it is possible to prevent deterioration of the in-vehicle battery 106 associated with a temperature rise, while allowing for quick charging of the in-vehicle battery 106.

Figure 5:
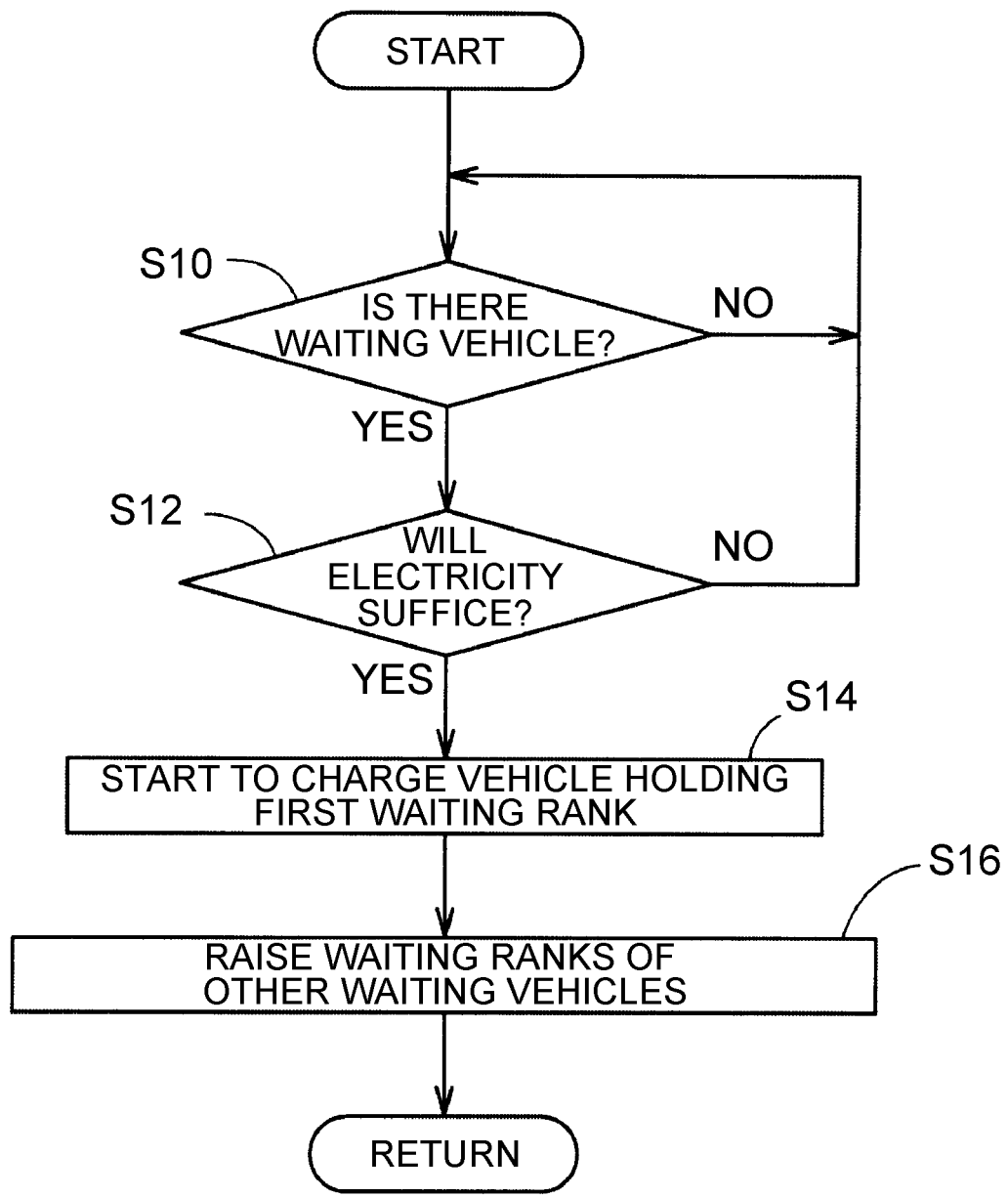
FIG. 5 is a flowchart showing a flow of charging at the charging station.

Next, the flow of charging at the charging station 10 will be described. FIG. 5 is a flowchart showing the flow of charging of the in-vehicle battery 106 at the charging station 10. The central control unit 20 checks whether there is a waiting vehicle on a constant basis (S10). A waiting vehicle refers to a vehicle which is connected to the charging stand 12 and has output a request to start charging to the charging station 10, but of which charging has not yet started. Such a waiting vehicle is given a waiting rank in advance. The waiting rank is a rank in an order of starting charging. The rule of how to determine this waiting rank will be described later. The central control unit 20 communicates with a plurality of individual control units 28 to determine whether there is a waiting vehicle.

When there is a waiting vehicle, then the central control unit 20 checks whether electricity will suffice to start charging of the waiting vehicle holding the first waiting rank (S12). Specifically, while the central control unit 20 can charge a plurality of electric vehicles 100 at the same time, depending on the vehicle models of the electric vehicles 100 and the required charging conditions (time limit, etc.), the total electricity output to these electric vehicles may exceed the maximum electricity that can be output from the charging station 10. Therefore, before starting to charge the waiting vehicle holding the first waiting rank, the central control unit 20 calculates the electricity required to charge the electric vehicle 100 being currently charged and the waiting vehicle holding the first waiting rank.

The electricity required to charge each vehicle may be calculated at the central control unit 20 or at the individual control unit 28. In either case, the charging electricity can be calculated based on the amount of electricity charged to the in-vehicle battery 106, a time limit for charging, and whether the external cooling is required. Of these, the amount of electricity charged to the in-vehicle battery 106 can be obtained from the battery capacity and the SOC of the in-vehicle battery 106, and such pieces of information are sent from the vehicle control unit 110. The time limit for charging can be set by a user. When the user does not set the time limit, the charging station 10 may set an allowable maximum charging time (e.g., three hours) as the time limit. As will be described later, whether the external cooling is required is determined according to the amount of heat generation by the in-vehicle battery 106 (an estimated value thereof), the outside air temperature, and the like.

When the charging electricity for the vehicle being charged and the charging electricity for the waiting vehicle holding the first waiting rank have been calculated, the central control unit 20 determines whether the total value of the two is equal to or smaller than the maximum output electricity of the charging station 10. When, as a result of the determination, the total value of the charging electricity is found to exceed the maximum output electricity (No in S12), the central control unit 20 does not start to charge the waiting vehicle holding the first waiting rank and keeps this waiting vehicle waiting.

On the other hand, when the total value of the charging outputs is found to be equal to or smaller than the maximum output electricity of the charging station 10 (Yes in S12), the central control unit 20 gives a command to the charging stand 12 to which the waiting vehicle holding the first waiting rank is connected, to start charging. Thus, charging of the waiting vehicle holding the first waiting rank is started (S14). When charging of one electric vehicle 100 has been started, the central control unit 20 raises the waiting ranks of other waiting vehicles by one (S16). Subsequently, the central control unit 20 repeats steps S10 to S16.

Here, the waiting rank will be described. As mentioned above, the waiting rank is a value indicating a rank in the order of starting charging. This waiting rank is given by the central control unit 20 at a timing at which the electric vehicle 100 is connected to the charging stand 12 and a charging command is input by the user. The central control unit 20 determines the waiting rank of each vehicle based on an order of inputting a charging command, the time limit, and the charging efficiency. Specifically, the central control unit 20 gives a higher waiting rank to a vehicle for which a charging command is input earlier (the timing at which the user gives a charging command is earlier). Therefore, for example, in the case where a charging command for a vehicle A, a charging command for a vehicle B, and a charging command for a vehicle C are input in this order, when the waiting rank of the vehicle A is an N-th rank, the waiting rank of the vehicle B is an (N+1)-th rank, and the waiting rank of the vehicle C is an (N+2)-th rank.

When charging commands for two or more vehicles are input roughly at the same time, the central control unit 20 determines, based on the time limit for charging, the priority ranks of these vehicles for which the charging commands have been input roughly at the same time. "Input roughly at the same time" means that charging commands are input within a certain time, which is normally from several tens of seconds to several minutes. When charging commands are input roughly at the same time, the central control unit 20 determines the waiting ranks in the order of the increasing time limit for charging. Therefore, for example, in the case where charging commands are received roughly at the same time from a vehicle A for which the time limit is 30 minutes and a vehicle B for which the time limit is two hours, the central control unit 20 sets the waiting rank of the vehicle A to an N-th rank and the waiting rank of the vehicle B to an (N+1)-th rank.

Moreover, when the time limits for two or more vehicles for which charging commands are input at the same time are equal, or when the time limits are not set, the central control unit 20 determines the waiting ranks in the order of the increasing amount of heat generation per unit time of the in-vehicle battery 106. The amount of heat generation by the in-vehicle battery 106 can be obtained from the charging electricity supplied from the charging unit 24 to the in-vehicle battery 106 and the internal resistance of the in-vehicle battery 106. The charging electricity can be determined with the battery capacity of the in-vehicle battery 106 and the time limit for charging taken into account. The individual control unit 28 acquires the internal resistance and the battery capacity of the in-vehicle battery 106 from the electric vehicle 100 through the communication I/Fs 22, 104, and calculates the amount of heat generation by the in-vehicle battery 106. The calculated amount of heat generation is sent to the central control unit 20, and the central control unit 20 determines the waiting rank based on this amount of heat generation.

Figure 6:
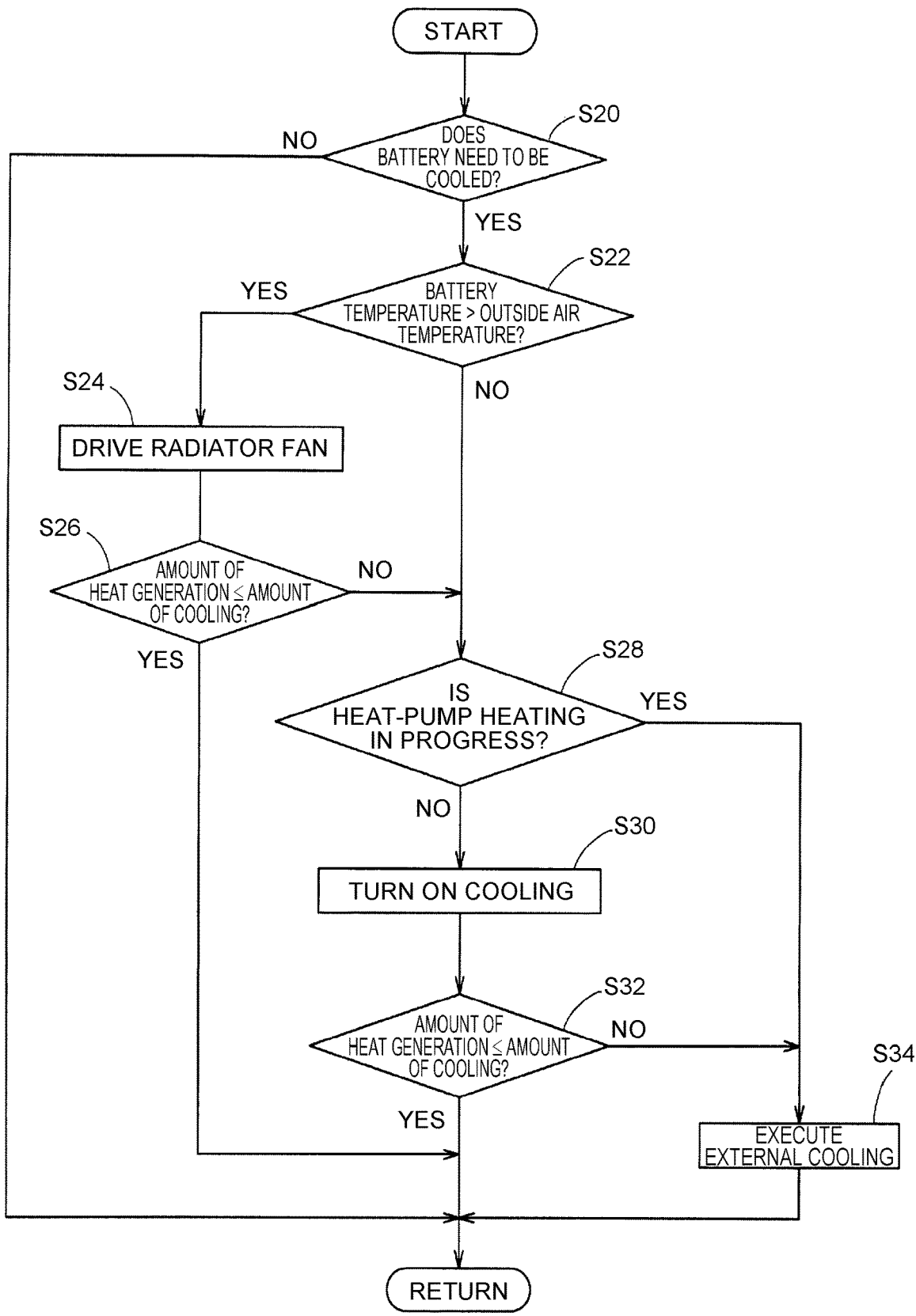
FIG. 6 is a flowchart showing a flow of a cooling process during charging.

When the in-vehicle battery 106 is to be charged, the individual control unit 28 determines whether the in-vehicle battery 106 needs to be cooled, and if necessary, cools the in-vehicle battery 106. The flow of the process of cooling the in-vehicle battery 106 will be described with reference to FIG. 6. FIG. 6 is a flowchart showing the flow of the cooling process during charging.

Figure 7:
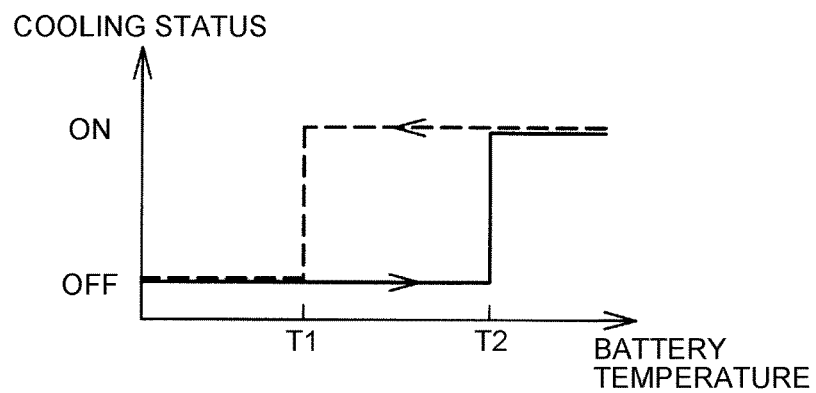
FIG. 7 is a temperature map used as reference to determine whether cooling is required.

The individual control unit 28 acquires the temperature of the in-vehicle battery 106 (battery temperature Tb) from the electric vehicle 100, and determines whether the in-vehicle battery 106 needs to be cooled based on the battery temperature Tb (S20). FIG. 7 is a temperature map used as reference for this determination. When the battery temperature Tb rises from a temperature lower than a second temperature T2 to a temperature equal to or higher than the second temperature T2, the individual control unit 28 switches the cooling status to "on." When the battery temperature Tb decreases from a temperature equal to or higher than a first temperature T1 (T1<T2) to a temperature lower than the first temperature T1, the individual control unit 28 switches the cooling status to "off." When the cooling status is off, the individual control unit 28 determines that the in-vehicle battery 106 does not need to be cooled, and waits there. On the other hand, when the cooling status is on, the individual control unit 28 determines that the in-vehicle battery 106 needs to be cooled.

When it is determined that the in-vehicle battery 106 needs to be cooled, the individual control unit 28 compares the battery temperature Tb and an outside air temperature Te (S22). As the outside air temperature Te, a value detected by a temperature sensor provided in the charging stand 12 may be used, or a value detected by an outside air temperature sensor provided in the electric vehicle 100 may be used. When, as a result of the comparison, the battery temperature Tb is found to be higher than the outside air temperature Te, the individual control unit 28 gives a command to the vehicle control unit 110 to drive a radiator fan 116 (S24). Upon receiving this command, the vehicle control unit 110 drives the radiator fan 116. Thus, the internal refrigerant, and ultimately the in-vehicle battery 106, is cooled by the outside air.

When the radiator fan 116 has been driven, the individual control unit 28 compares the amount of cooling by the radiator fan 116 (the amount of cooling by air cooling) and the amount of heat generation by the in-vehicle battery 106 (S26). The amount of cooling in this case can be obtained from the value of the difference between the outside air temperature Te and the battery temperature Tb, and the rotation speed of the radiator fan 116. As described above, the amount of heat generation can be obtained from the internal resistance of the in-vehicle battery 106 and the charging electricity. Here, the larger the capacity of the in-vehicle battery 106, and the shorter the time limit for charging, the larger the amount of heat generation by the battery. When, as a result of the comparison, the amount of heat generation is found to be equal to or smaller than the amount of cooling, it can be determined that the in-vehicle battery 106 can be sufficiently cooled by air cooling by the internal cooling device 108 alone. In this case, therefore, the individual control unit 28 maintains the current state.

On the other hand, when the battery temperature Tb is found to be equal to or lower than the outside air temperature Te (No in S22), or when the amount of cooling by air cooling is found to be smaller than the amount of heat generation by the battery (No in S26), forced cooling using the cooling function or the external cooling by the external cooling device 26 is required. However, as described above, the cooling function of the air-conditioning system 120 cannot be used during execution of heat-pump heating.

In this case, therefore, the individual control unit 28 checks whether heat-pump heating is in progress (S28). Specifically, the individual control unit 28 inquires of the vehicle control unit 110 through the communication I/Fs 22, 104 about the operating state of air conditioning. When, as a result of the inquiry, heat-pump heating is found to be being executed, the internal cooling device 108 executes the external cooling (S34). Specifically, the individual control unit 28 outputs a command to the vehicle control unit 110 to switch the three-way valve V1 toward the outflow channel 152. Moreover, the individual control unit 28 drives the compressor 34, etc. of the external cooling device 26 to forcedly cool the external refrigerant.

On the other hand, when heat-pump heating is found to be not being executed (No in S28), the individual control unit 28 gives a command to the electric vehicle 100 to execute forced air cooling using the cooling function (S30). Upon receiving this command, the vehicle control unit 110 drives the air-conditioning compressor 122, etc., and switches the three-way valve V3 toward the detour channel such that the internal refrigerant is subjected to cooling air.

When cooling has been turned on, then the individual control unit 28 compares the amount of cooling by this cooling and the amount of heat generation by the battery (S32). The amount of cooling in this case can be obtained based on the capacity of the air-conditioning system 120. When, as a result of the comparison, the amount of cooling is found to be smaller than the amount of heat generation (No in S32), the individual control unit 28 executes the external cooling (S34). Thus, the in-vehicle battery 106 can be appropriately cooled.

On the other hand, when it is determined in step S32 that the amount of cooling by the cooling is equal to or larger than the amount of heat generation by the battery, the individual control unit 28 determines that the in-vehicle battery 106 can be sufficiently cooled by air cooling by the internal cooling device 108 alone, and maintains the current state.

As is clear from the above description, in this example, the external cooling device 26 having a higher cooling capacity than the internal cooling device 108 is provided, and the in-vehicle battery 106 is cooled by the external cooling device 26 as necessary. As a result, heat deterioration of the in-vehicle battery 106 can be prevented even when a large amount of heat is generated, so that charging of a high-capacity battery or charging of a battery in a short time becomes possible. Moreover, in this example, when the battery temperature Tb is higher than the outside air temperature Te, a command is given to the electric vehicle 100 to cool the in-vehicle battery 106 by driving the radiator fan 116, i.e., using the air-cooling function. Thus, electricity used to cool the in-vehicle battery 106 can be reduced to save on electricity.

When the external cooling is executed, an extra amount of electricity is consumed. Therefore, when the external cooling is executed, a cost according to this extra amount of electricity may be billed to the user. In this case, whether the external cooling can be executed may be checked with the user prior to the execution of the external cooling. In this example, cooling using the in-vehicle cooling function is executed in preference to the external cooling. However, when the external cooling is more efficient (e.g., consumes less electricity) than cooling using the cooling function, the former may be executed in preference to the latter.

Figure 8:
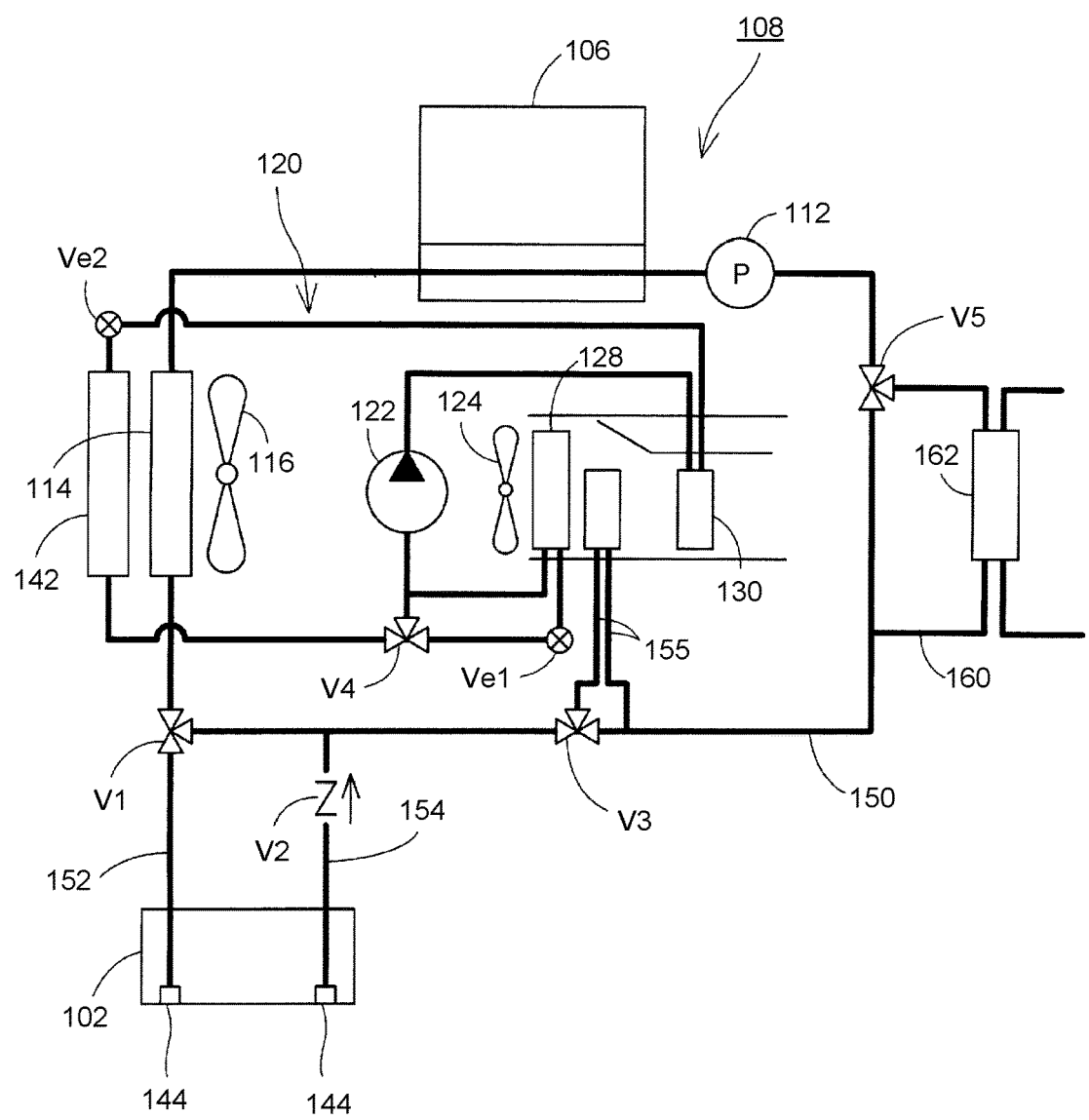
FIG. 8 is a view showing another example of the internal cooling device.
Figure 9:
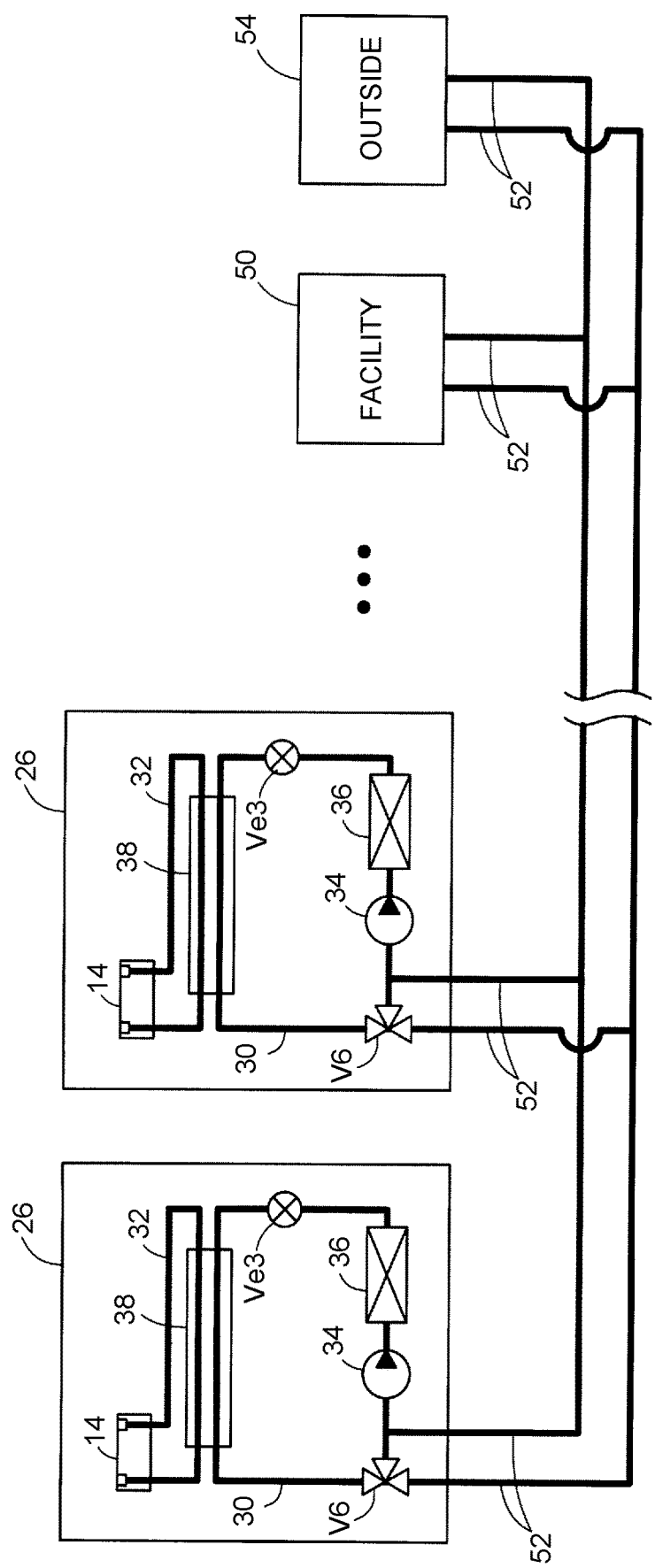
FIG. 9 is a view showing another example of the external cooling device.
Figure 10:
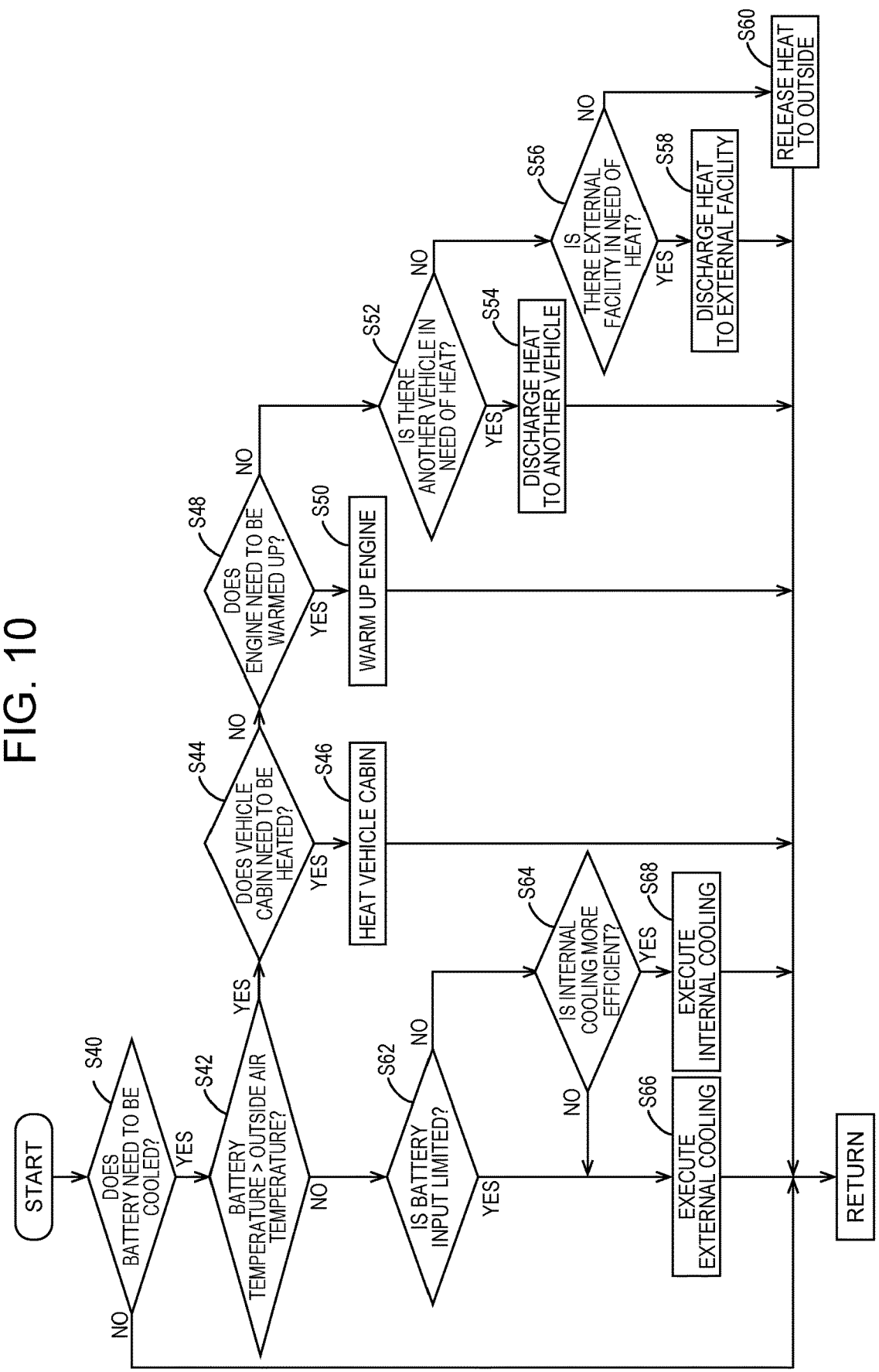
FIG. 10 is a flowchart showing another example of the flow of the cooling process during charging.

In the above example, the heat of the internal refrigerant (i.e., the heat of the in-vehicle battery 106) is basically discarded. However, as necessary, the heat of the in-vehicle battery 106 may be effectively used inside the vehicle or in another vehicle or facility. This case will be described with reference to FIG. 8 to FIG. 10. FIG. 8 is a view showing another example of the internal cooling device 108. FIG. 9 is a view showing another example of the external cooling device 26. FIG. 10 is a flowchart showing another example of the flow of the cooling process during charging. The internal cooling device 108 shown in FIG. 8 is different from the internal cooling device 108 shown in FIG. 3 in that the former has a warm-up heat exchanger 162 that exchanges heat with an engine coolant, and a warm-up channel 160 that runs through the warm-up heat exchanger 162. The warm-up channel 160 is a bypass that branches off from the standard channel 150 and returns to the standard channel 150, and a three-way valve V5 is provided at a point at which the warm-up channel 160 branches off. As necessary, the internal refrigerant is passed through the warm-up channel 160, and thereby the heat of the in-vehicle battery 106 can be used to warm up the engine. When the internal refrigerant is passed through the detour channel 155 in a state where the three-way valve V4 is switched toward the air-conditioning compressor 122 (i.e., in a state where the air-conditioning refrigerant is not passed through the evaporator 128), air warmed by the heat of the internal refrigerant is sent to the vehicle cabin by the air-conditioning fan 124.

The external cooling device 26 shown in FIG. 9 is different from the external cooling device 26 shown in FIG. 4 in that the former has another external cooling device 26 and connection channels 52 communicating with an external facility 50 and an outside 54. A three-way valve V6 is provided at a base end of each connection channel 52, and opening and closing of the three-way valve V6 can be controlled so as to switch the communication destination of the connection channel 52.

The in-vehicle battery 106 is charged at the charging station 10 of this configuration as shown in FIG. 10. The individual control unit 28 determines whether the in-vehicle battery 106 needs to be cooled (S40). This determination is made based on the temperature map shown in FIG. 7. Then, the individual control unit 28 compares the battery temperature Tb and the outside air temperature Te (S42). When, as a result of the comparison, the battery temperature Tb is found to be higher than the outside air temperature Te, the individual control unit 28 uses the heat of the in-vehicle battery 106 for a heating or warming process inside or outside the vehicle. Specifically, when the battery temperature Tb is higher than the outside air temperature Te, the individual control unit 28 first determines whether the vehicle cabin needs to be cooled (S44). When, as a result of checking, it is determined that the vehicle cabin needs to be heated, the individual control unit 28 gives a command to the vehicle control unit 110 to heat the vehicle cabin by using the heat of the in-vehicle battery 106 (S46). Upon receiving this command, the vehicle control unit 110 switches the three-way valve V1 so as to block the flow of the refrigerant to the outflow channel 152. Further, the vehicle control unit 110 switches the three-way valve V3 so as to allow the internal refrigerant to flow through the detour channel 155, and switches the three-way valve V4 such that the air-conditioning refrigerant does not pass through the evaporator 128. Thus, air warmed by the internal refrigerant flowing through the detour channel 155 is sent into the vehicle cabin by the air-conditioning fan 124. On the other hand, the internal refrigerant is cooled by the air inside the vehicle cabin.

On the other hand, when the vehicle cabin does not need to be heated, then the individual control unit 28 inquires of the vehicle control unit 110 as to whether the engine needs to be warmed up (S48). In the case of an electric automobile that is not equipped with an engine, the result of the inquiry in step S48 is of course always No. When the engine needs to be warmed up, the individual control unit 28 gives a command to the vehicle control unit 110 to warm up the engine by using the heat of the in-vehicle battery 106 (S50). Upon receiving this command, the vehicle control unit 110 switches the three-way valve V5 so as to allow the internal refrigerant to flow through the warm-up channel. Thus, the engine coolant and the internal refrigerant exchange heat with each other and thereby the engine is warmed up.

When neither heating of the vehicle cabin nor warming up of the engine is required, i.e., when the electric vehicle 100 being charged does not need heat, the individual control unit 28 checks whether there is another vehicle in need of heat (S52). Specifically, a plurality of charging stands 12 is provided in the charging station 10 and a plurality of electric vehicles 100 can be connected at the same time. All the electric vehicles 100 thus connected to the charging stands 12 are not being charged, and there are waiting vehicles left waiting to be charged due to a shortage of electricity and unattended vehicles that are left unattended after completion of charging without being disconnected. In such a waiting vehicle or an unattended vehicle, no current is applied to the in-vehicle battery 106 (the in-vehicle battery 106 is not charged), so that the temperature of the in-vehicle battery 106 can become low. When the in-vehicle battery 106 has an excessively low temperature, electricity input into or output from the in-vehicle battery 106 is limited, which results in a delay in the rise of a charging current or limitation of electricity output at the start of running. Therefore, when there is a vehicle of which the in-vehicle battery 106 needs to be warmed up among waiting vehicles or unattended vehicles, the heat of the in-vehicle battery 106 being charged is sent to this vehicle. Specifically, the individual control unit 28 inquires of the central control unit 20 as to whether there is a vehicle of which the battery needs to be warmed up. When, as a result of the inquiry, a vehicle of which the battery needs to be warmed up is found, the individual control unit 28 sends the heat of the in-vehicle battery 106 to that other waiting vehicle or unattended vehicle through the external cooling device 26 (S54). Specifically, in each of the heat-sending electric vehicle 100 and the heat-receiving electric vehicle 100, the three-way valve V1 is opened toward the inlet 102 so as to allow the internal refrigerant to flow to the external cooling device 26. Further, in the external cooling device 26, the three-way valve V6 is switched toward the connection channel 52 in a state where driving of the compressor 34 and the condenser 130 is stopped. Thus, the heat of the heat-sending vehicle is sent to the heat-receiving vehicle through the external refrigerant, and the battery is warmed up. While only whether the battery of another vehicle needs to be warmed up is checked in this example, heat may be sent according to whether the engine or the vehicle cabin, instead of the battery, of another vehicle needs to be warmed up.

When another vehicle in need of heat is not found, then the individual control unit 28 checks whether there is an external facility 50 in need of heat (S56). Examples of the external facility 50 include a footbath facility and an indoor heating facility. When there is an external facility in need of heat, the individual control unit 28 sends the heat of the in-vehicle battery 106 to the external facility 50. Specifically, in the electric vehicle 100, the three-way valve V1 is opened toward the inlet 102 so as to allow the internal refrigerant to flow to the external cooling device 26. Further, in the external cooling device 26, the three-way valve V6 is switched toward the connection channel 52 in a state where driving of the compressor 34 and the condenser 130 is stopped, so as to allow the external channel 30 and the external facility 50 to communicate with each other. Thus, the heat of the electric vehicle 100 is sent to the external facility 50 through the external refrigerant. When there is no external facility 50 in need of heat, either, the individual control unit 28 releases the heat of the in-vehicle battery 106 to the outside 54 (S60). In other words, the individual control unit 28 switches the communication destination of the external refrigerant to the outside 54.

On the other hand, when the battery temperature Tb is equal to or lower than the outside air temperature Te (No in S42), the individual control unit 28 moves to step S62. In step S62, the individual control unit 28 determines whether the electricity input into the in-vehicle battery 106 is limited (S62). Specifically, the maximum electricity input into or output from the in-vehicle battery 106 is limited for battery protection, not only when the in-vehicle battery 106 has an excessively low temperature but also when the in-vehicle battery 106 has an excessively high temperature. When the electricity input is thus limited, charging electricity that can be supplied is reduced, which results in a prolonged charging time. Therefore, when the electricity input is limited, the external cooling is executed to promptly cool the in-vehicle battery 106 (S66). On the other hand, when the electricity input is not limited, the individual control unit 28 moves to step S64 and compares the efficiency of the external cooling and the efficiency of the internal cooling. The efficiency is determined, for example, based on whether cooling by the internal cooling device 108 can be used, the result of a comparison between the cooling capacity of this cooling and the amount of heat generation by the battery, and the result of a comparison between the electricity consumption of the internal cooling and that of the external cooling. When it is determined that the internal cooling is more efficient, the individual control unit 28 gives a command to the vehicle control unit 110 to execute internal cooling (S68).

As is clear from the above description, in this example, the heat of the in-vehicle battery 106 is used to warm up the vehicle cabin or the engine or sent to another vehicle or the external facility 50. As a result, electricity used for cooling can be reduced. In particular, when one's own vehicle does not need heat, one can allow the heat of the in-vehicle battery 106 to be used to warm up the battery of another vehicle, which can accelerate the rise of a charging current in that vehicle and effectively prevent limitation of electricity at the start of running of that vehicle.

Figure 11:
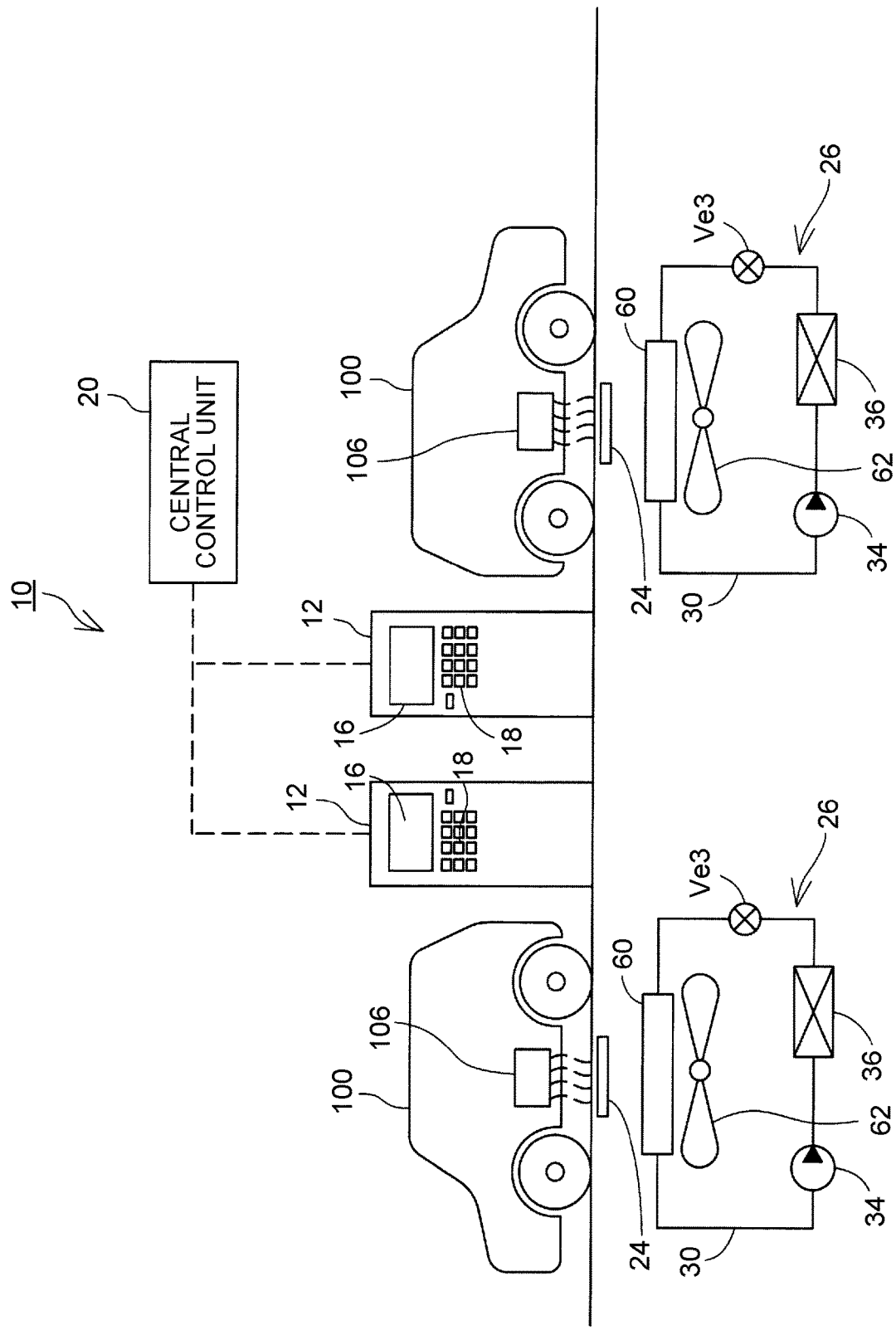
FIG. 11 is a schematic view of a charging station adopting a contactless charging method.

So far, only the form of wired charging using the charging plug 14 has been described as an example. However, some proposals have been made on contactless charging in which the in-vehicle battery 106 is charged in a contactless state without wired connection to the charging unit 24 of the charging stand 12. FIG. 11 is a schematic view of a charging station 10 adopting a contactless charging method. In this case, the charging unit 24 is provided under the floor of the charging stand 12. The charging unit 24 has a power transmission unit as a resonant circuit having a coil, and a power source unit that supplies high-frequency alternating-current power to the power transmission unit (neither is shown). The in-vehicle battery 106 has a power reception unit that is formed as a resonant circuit having a coil and receives electricity from the power transmission unit in a contactless manner, and a rectifier that converts the alternating-current power from the power reception unit into direct-current power and supplies this direct-current power to a cell (neither is shown). The charging electricity is transmitted to the in-vehicle battery 106 as the respective coils of the charging stand 12 and the in-vehicle battery 106 resonate through an electromagnetic field.

Also in this case, a cooling device that cools the in-vehicle battery 106 is provided in each of the electric vehicle 100 and the charging stand 12. Except that the outflow channel 152 and the inflow channel 154 are not provided, the internal cooling device 108 is almost the same as that shown in FIG. 3 or in FIG. 9. On the other hand, the external cooling device 26 includes a heat exchanger 60 that exchanges heat between the internal refrigerant and outside air, and an external fan 62, in addition to the external channel 30 through which the external refrigerant flows, the compressor 34, the condenser 36, and the expansion valve Ve3. The external fan 62 is provided under the floor, and when driven, the external fan 62 can blow air to the in-vehicle battery 106 or the internal refrigerant. The heat exchanger 60 is provided between the external fan 62 and the electric vehicle 100, and outside air (cold air) having exchanged heat with the internal refrigerant can be sent to the electric vehicle 100. This external cooling device 26 is capable of fan cooling of sending outside air to the in-vehicle battery 106, etc. by the external fan 62 in a state where driving of the compressor 34 is stopped, and forced cooling of cooling the outside air to be sent by the external fan 62 by using the compressor 34, etc.

Figure 12:
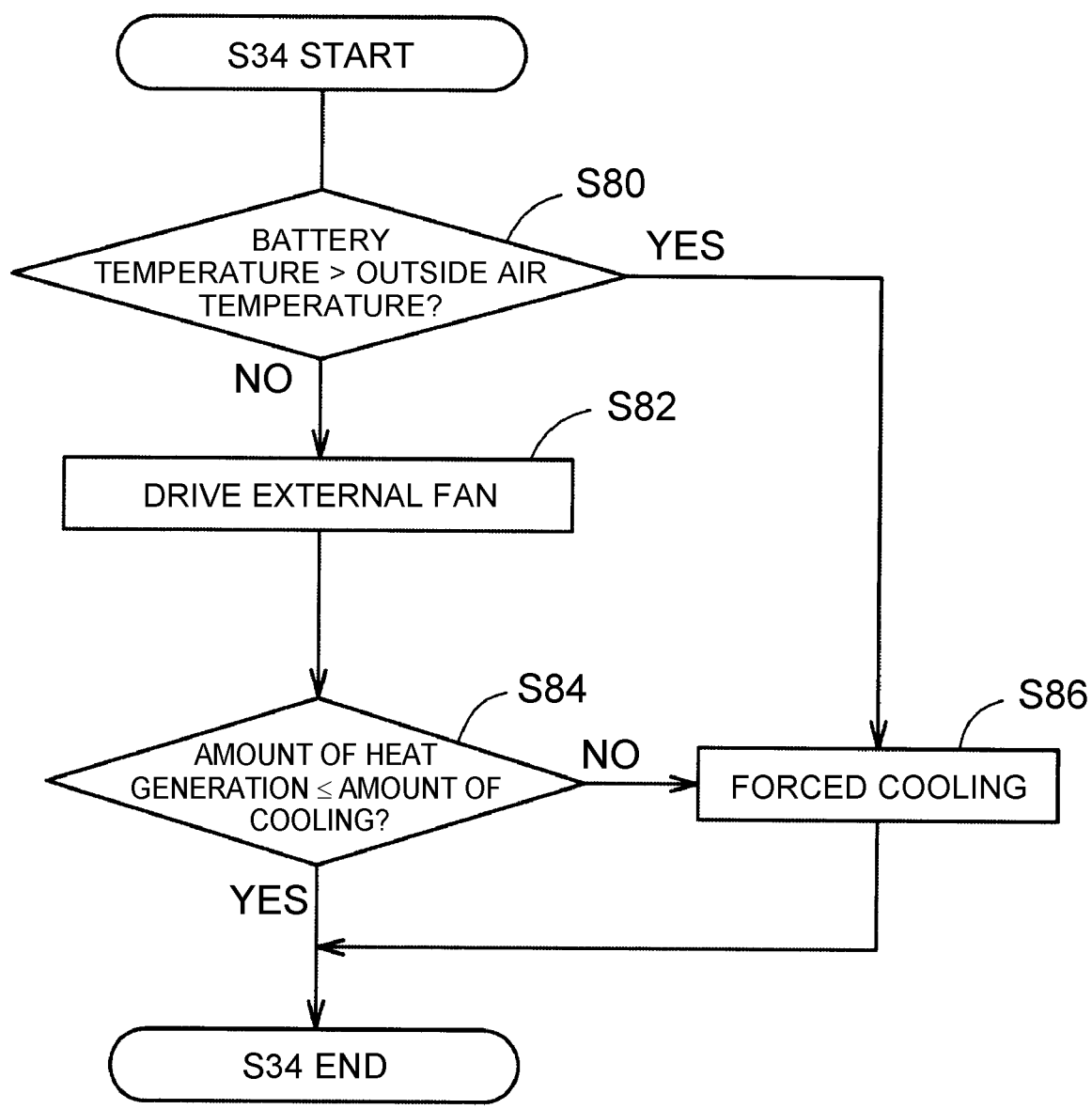
FIG. 12 is a view showing a flow of a process within step S34.

The flow of the cooling process in the case where this external cooling device 26 is used is almost the same as the cooling process shown in FIG. 6. However, in the case where this external cooling device 26 is used, it is necessary to further determine which of fan cooling and forced cooling is to be executed when the external cooling (S34) is selected. FIG. 12 is a view showing the flow in the case where the external cooling is selected, i.e., the flow of a process within step S34.

When the external cooling is selected, the individual control unit 28 compares the battery temperature Tb and the outside air temperature Te (S80). When, as a result of the comparison, the battery temperature Tb is found to be higher than the outside air temperature Te, driving the fan alone cannot cool the in-vehicle battery 106. Therefore, the individual control unit 28 executes forced cooling by driving the external fan 62, the compressor 34, etc. (S86).

On the other hand, when the battery temperature Tb is found to be equal to or lower than the outside air temperature Te, the individual control unit 28 drives the external fan 62 (S82). Further, the individual control unit 28 compares the amount of heat generation by the battery and the amount of cooling by fan cooling (S84). The amount of cooling by fan cooling can be obtained from the rotation speed of the cooling fan, the value of the difference between the battery temperature Tb and the outside air temperature Te, and the like. When, as a result of the comparison, the amount of heat generation by the battery is found to be larger than the amount of fan cooling, the individual control unit 28 executes forced cooling (S86). On the other hand, when the amount of heat generation by the battery is found to be equal to or smaller than the amount of fan cooling, the individual control unit 28 maintains the state where the external fan 62 is driven while driving of the compressor 34, etc. is stopped (the state in S82).

As is clear from the above description, also in the case of contactless charging, blowing air to the in-vehicle battery 106, etc. by the external fan 62 can cool the in-vehicle battery 106. Thus, charging of a high-capacity in-vehicle battery 106 or charging in a short time becomes possible. Also in the case of contactless charging, a mechanism may be provided that sends heat from the in-vehicle battery 106 to a destination inside the electric vehicle 100 or to another electric vehicle 100, an external facility, etc.

All the configurations having been described above are merely examples. As long as at least the external cooling device 26 is provided with the external channel 30 through which the external refrigerant flows, the cooling mechanism that cools the external refrigerant by using the compressor 34, and the heat exchanger that exchanges heat between the cooled external refrigerant and the internal refrigerant or between the cooled external refrigerant and outside air sent to the electric vehicle 100, the other configurations may be changed as appropriate.

What is claimed is:

1. A charging system that is installed outside an electric vehicle and configured to charge an in-vehicle battery mounted in the electric vehicle, the charging system comprising:
    a charger configured to supply electricity to the in-vehicle battery;
    an external cooling device configured to cool the in-vehicle battery, the external cooling device including an external channel through which an external refrigerant flows, a cooling mechanism configured to cool the external refrigerant, and a heat exchanger,
      the external channel being provided inside the charging system,
      the cooling mechanism including at least a compressor, and
      the heat exchanger being configured to exchange heat between the cooled external refrigerant and an internal refrigerant that flows inside the electric vehicle so as to cool the in-vehicle battery or between the cooled external refrigerant and outside air that is sent to the electric vehicle so as to cool the in-vehicle battery; and
    an off-vehicle controller configured to control driving of the charger and the external cooling device, wherein
    the electric vehicle includes an internal cooling device configured to cool the in-vehicle battery through heat exchange with outside air,
    the off-vehicle controller is configured to control the external cooling device to cool the in-vehicle battery when the internal cooling device cannot cool the in-vehicle battery, and to control the external cooling device not to cool the in-vehicle battery when the internal cooling device can cool the in-vehicle battery, and
    when charging commands for two or more electric vehicles are input within a certain time, the off-vehicle controller is configured to determine a waiting rank that is a rank in an order of starting charging, based on a charging time limit and an amount of heat generation per unit time of each electric vehicle.

2. The charging system according to claim 1, wherein the off-vehicle controller is configured to determine whether external cooling that is cooling by the external cooling device is required, based on a result of a comparison between an amount of cooling by the internal cooling device and an amount of heat generation by the in-vehicle battery.

3. The charging system according to claim 1, wherein the off-vehicle controller is configured to allow heat from the in-vehicle battery of the electric vehicle to be used to warm up a battery of another electric vehicle when, while the electric vehicle is charged, the in-vehicle battery needs to be cooled and a temperature of the in-vehicle battery is higher than a temperature of the outside air and the electric vehicle does not need heat.

4. The charging system according to claim 1, further comprising a plug that is attachable to and detachable from an inlet provided in the electric vehicle, wherein:
    the external cooling device further includes a bypass channel that is fluid-coupled to an in-vehicle channel which is provided inside the electric vehicle and through which the internal refrigerant flows, and that is provided so as to guide the internal refrigerant to the heat exchanger and return the internal refrigerant having passed through the heat exchanger to the in-vehicle channel;
    the heat exchanger is configured to exchange heat between the cooled external refrigerant and the internal refrigerant; and
    the plug has an electricity terminal through which the charger and the in-vehicle battery are electrically connected to each other, and a fluid coupler through which the bypass channel and the in-vehicle channel are fluidically coupled to each other.

5. The charging system according to claim 1, wherein:
    the charger is configured to transmit electricity to the in-vehicle battery in a contactless manner;
    the external cooling device further includes an external fan that blows air to the electric vehicle; and
    the heat exchanger is configured to exchange heat between the external refrigerant and outside air that is blown to the electric vehicle by the external fan.

6. The charging system according to claim 1, wherein:
    the internal cooling device includes a standard channel through which the internal refrigerant flows.

7. The charging system according to claim 6, wherein:
    the standard channel runs from a pump through an in-vehicle battery and a radiator core back to the pump.

8. The charging system according to claim 7, wherein:
    the internal refrigerant, of which temperature has risen as a result of heat exchange with the in-vehicle battery, is cooled by exchanging heat with outside air in the radiator core.

9. A charging system that is installed outside an electric vehicle and configured to charge an in-vehicle battery mounted in the electric vehicle, the charging system comprising:

a charger configured to supply electricity to the in-vehicle battery;

an external cooling device configured to cool the in-vehicle battery, the external cooling device including an external channel through which an external refrigerant flows, a cooling mechanism configured to cool the external refrigerant, and a heat exchanger, the external channel being provided inside the charging system, the cooling mechanism including at least a compressor, the heat exchanger being configured to exchange heat between the cooled external refrigerant and an internal refrigerant that flows inside the electric vehicle so as to cool the in-vehicle battery or between the cooled external refrigerant and outside air that is sent to the electric vehicle so as to cool the in-vehicle battery; and an off-vehicle controller configured to control driving of the charger and the external cooling device, wherein when charging commands for two or more electric vehicles are input within a certain time, the off-vehicle controller is configured to determine a waiting rank that is a rank in an order of starting charging, based on a charging time limit and an amount of heat generation per unit time of each electric vehicle.

10. A charging system that is installed outside an electric vehicle and configured to charge an in-vehicle battery mounted in the electric vehicle, the charging system comprising:

a charger configured to supply electricity to the in-vehicle battery;

an external cooling device configured to cool the in-vehicle battery, the external cooling device including an external channel through which an external refrigerant flows, a cooling mechanism configured to cool the external refrigerant, and a heat exchanger, the external channel being provided inside the charging system, the cooling mechanism including at least a compressor, and the heat exchanger being configured to exchange heat between the cooled external refrigerant and an internal refrigerant that flows inside the electric vehicle so as to cool the in-vehicle battery or between the cooled external refrigerant and outside air that is sent to the electric vehicle so as to cool the in-vehicle battery; and an off-vehicle controller configured to control driving of the charger and the external cooling device, wherein the electric vehicle includes an internal cooling device configured to cool the in-vehicle battery through heat exchange with outside air, the off-vehicle controller is configured to control the external cooling device to cool the in-vehicle battery when the internal cooling device cannot cool the in-vehicle battery, and to control the external cooling device not to cool the in-vehicle battery when the internal cooling device can cool the in-vehicle battery, and the off-vehicle controller is configured to determine that the internal cooling device cannot cool the in-vehicle battery when a heat pump heating is being executed in the electric vehicle, and to determine that the internal cooling device can cool the in-vehicle battery when the heat pump heating is not being executed in the electric vehicle.

11. The charging system according to claim 10, wherein:

the off-vehicle controller is configured to control the external cooling device to cool the in-vehicle battery when the in-vehicle battery needs to be cooled, a temperature of the in-vehicle battery is equal to or lower than a temperature of the outside air, and the heat pump heating is being executed in the electric vehicle; and the off-vehicle controller is configured to control the internal cooling device to cool the in-vehicle battery when the in-vehicle battery needs to be cooled, the temperature of the in-vehicle battery is equal to or lower than the temperature of the outside air, and the heat pump heating is not being executed in the electric vehicle.

* * * * *